June 5, 1956

G. C. FRICKE ET AL 2,748,948

FILTERING DEVICE

Filed Aug. 15, 1950

INVENTOR.
GUY C. FRICKE
WALTER KASTEN
BY
M. A. Hobbs
ATTORNEY

United States Patent Office 2,748,948
Patented June 5, 1956

2,748,948

FILTERING DEVICE

Guy C. Fricke and Walter Kasten, Detroit, Mich., assignors to Bendix Aviation Corporation, South Bend, Ind., a corporation of Delaware Application August 15, 1950, Serial No. 179,482

6 Claims. (Cl. 210—169)

The present invention relates to fluid purifying devices, and more particularly to a novel element for said devices.

In fluid filters of the surface filtration type, the foreign matter removed from the fluid accumulates on the surface of the filter element, forming a layer which gradually increases in thickness and density to a point where the operation of the filtering device may become unsatisfactory. In order for the element to continue in operation, the layer of foreign matter is usually removed by a backwashing operation which, as the term indicates, entails the reversal of fluid flow through the filter element. In conventional elements of the surface filtration type, each backwashing operation leaves a small amount of foreign matter on the element which gradually builds up to an adherent permanent coat, eventually decreasing the efficiency of the element to the point where replacement is necessary. It is, therefore, one of the principal objects of the present invention to provide a novel element for the aforesaid devices, wherein the layer of foreign matter accumulated during filtration is so fully removed during the backwashing operation that the life of the element is greatly increased over that of similar conventional elements.

Another object of the invention is to provide a fluid purifying element, such as a filter element, which has high efficiency in both the purification and backwashing operations.

Another object of the present invention is to provide an element for a filtering device wherein the tendency of the foreign matter to form an adherent permanent coat is entirely eliminated or greatly minimized.

A further object of the invention is to provide a filter element in which the fluid flow during backwashing is so controlled that the efficiency of the backwashing operation is greatly increased over that of similar conventional elements.

Still another object of the invention is to provide a fluid purifying device which can be readily and thoroughly cleaned by a backwashing operation.

Another object is to provide a relatively simple and reliable means for retaining a filter element in operative position in a filtering apparatus.

Additional objects and advantages of the present invention will appear from the following description and accompanying drawing, wherein.

Figure 1:
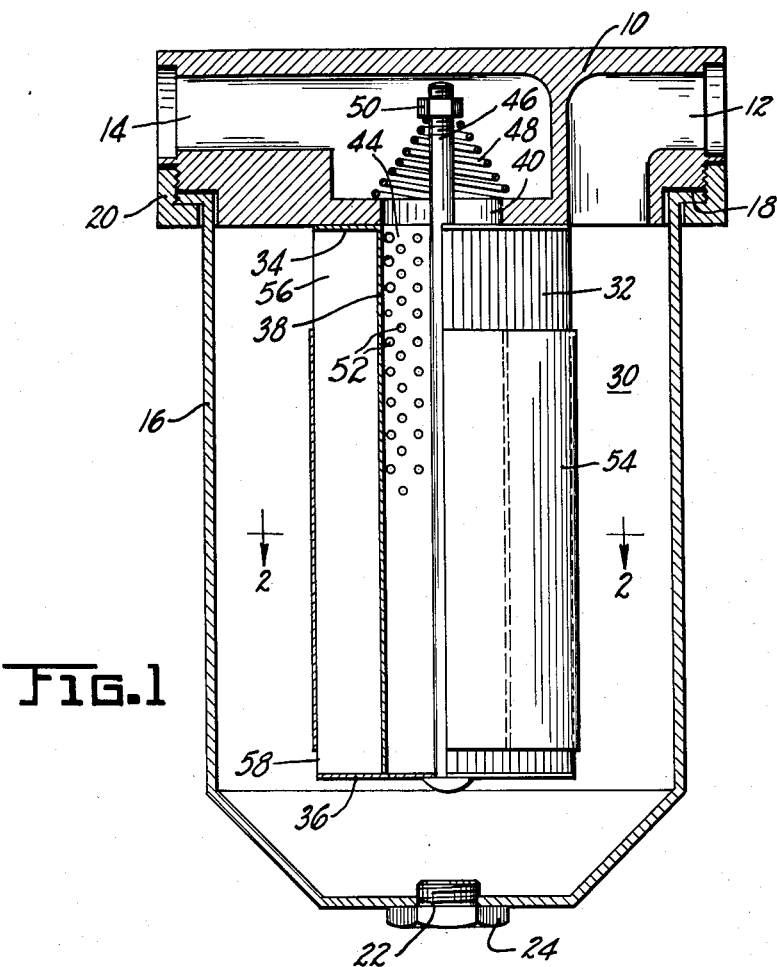
Figure 1 is a cross-sectional view of a filtering device embodying my invention, showing the filter element in partial cross section.
Figure 2:
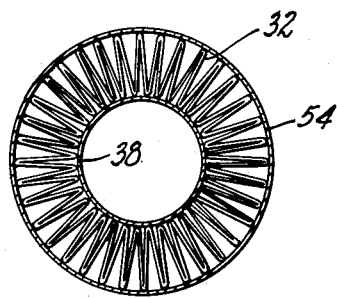
Figure 2 is a cross-sectional view of the filter element taken on line 2—2 of Figure 1.

The drawing illustrates a conventional filter casing or housing consisting of a head 10, a fluid inlet passage 12, a fluid outlet passage 14, and a bowl 16 depending from the lower side of the head and sealed thereto by a gasket 18 and a retaining ring 20 threadedly secured to an annular shoulder on the side of said head. The inlet and outlet passages contain annular recesses for receiving suitable fittings for installation of the device in a fuel line or the like and the head preferably contains brackets (not shown) for mounting the device on an engine or other mechanism. Drain port 22 normally closed by plug 24 is provided in the bottom of bowl 16. A by-pass (not shown) may be provided in the filter head to permit the fluid to pass directly from inlet passage 12 to outlet passage 14 when the filter element becomes clogged with foreign matter to the extent that the fluid flow therethrough is substantially restricted.

The filter element generally designated as numeral 30 consists of vertically pleated side walls 32 of resinous impregnated paper or other suitable filtering medium, disc-like plates 34 and 36 cemented to the ends of the side walls at the top and bottom, respectively, and a tube or core 38 which, together with said plates, gives substantial rigidity to the element side walls and retains said walls in a cylindrical shape. Plate 34 seats on a flat surface around the entrance 40 to the fluid outlet passage and contains a central opening 44 which aligns with said entrance when the element is assembled in position in the casing, the element being held in position by a vertical rod 46 connected to plate 36 and a spring 48 reacting between a nut or collar 50 on the upper end of the rod and the top side of the wall defining the entrance to said outlet passage. The upper half of tube 38 contains perforations 52 which form passages for fluid flowing from the pleated side walls to the outlet passage 14, the lower half of said tube being imperforate.

An impervious cylindrical shell 54 of resinous impregnated paper or other suitable material encloses the central portion of the pleated side walls, leaving the ends of the pleated walls exposed and defining annular fluid passages 56 and 58 at the top and bottom respectively. Shell 54, which is secured by cement or the like to the outside edge of the pleats to maintain uniform spacing thereof and prevent their distortion during service, primarily functions as a baffle to direct the flow of fluid parallel to the outside surface of the pleats. With the annular space above and below the shell, the fluid flows from the element at the top and bottom during backwashing and must flow parallel with the pleats throughout most of their length. The fluid leaving the pleated portion covered by the shell tends to continue in a direction substantially parallel with the pleats until it reaches the end plates, where it removes any foreign matter deposited there during the operation of the filter. Since the deposit of foreign matter is usually heavier on the bottom end plate than on the top end plate, annular space 58 is preferably relatively narrow so that the fluid passing from under the shell will be directed forcefully against the bottom end plate.

The broad concept of a perforated core, pleated side walls, plates at each end and a shell around said walls spaced from one of the end plates is claimed in application Serial No. 152,231, filed May 27, 1950 by Walter Kasten. The feature consisting of a core having the perforations confined to one end is specifically claimed in application Serial No. 152,025, filed March 27, 1950 by Hans P. Winzen. The present invention is an improvement on the inventions covered by these two prior applications.

In the operation of the filtering device illustrated in the drawing, fluid such as gasoline enters the device through inlet passage 12, flows downwardly into bowl 16 around the outside of filter element 30, and thence passes through annular spaces 56 and 58, pleated paper side walls 32 and perforations 52 of tube 38, leaving the device through outlet passage 14. As the fluid passes through the filter element, the foreign matter, such as grit, water, sludge and the like, collects on the external surface of the side walls, gradually forming a layer which eventually materially restricts the flow of fluid therethrough. After the layer has increased to a thickness and density sufficient to restrict the flow of fluid but before it is sufficient to materially impair the efficient operation of the filter, the operator reverses the flow of fluid through the element by closing off the inlet passage 12, removing plug 24 and introducing fluid through outlet passage 14. In this backwashing operation, the fluid flows downwardly and upwardly along the outside surface of the pleats, passing outwardly through spaces 56 and 58 to port 22 in the bottom of the bowl. By directing the fluid so that it flows not only through the side walls but also parallel with the pleats of the side walls adjacent the outside surface thereof, foreign matter which has collected thereon is first loosened and partially removed by the fluid passing through the walls and is then washed away by the fluid flowing between the pleats along the outside surface thereof. As the fluid passes outwardly through spaces 56 and 58, any sediment which has accumulated at the top of the pleats on plate 34 and at the bottom on plate 36 is removed by the action of the fluid sweeping over said plates.

In addition to directing the flow of fluid along the pleats, the shell prevents distortion of the pleats and holds them in equi-spaced relationship so that during the backwashing operation a relatively strong flow of fluid occurs in each space between the outside surfaces of the pleats to wash said surfaces free of foreign matter.

The present invention is not limited to any particular type of filtering device, container or housing, and the filter element may be either used singly, as shown in Figure 1, or may be one of many in a large fluid purifying device. Modifications may be made in the element itself, including changes in size, shape, design and materials, to suit requirements.

We claim:

1. A filter element comprising a cylindrically-shaped perforated core, filter material around said core pleated in a direction longitudinal with the axis thereof, plates closing the ends of said pleats, and an impervious shell around said pleated material in close proximity thereto positioned between and spaced axially from opposed inner surfaces of said plates and covering a major portion of the outside surface of said pleated material.

2. A filter element comprising a cylindrically-shaped perforated core, filter material around said core pleated in a direction longitudinal with the axis thereof, plates closing the ends of said pleats, and an impervious shell around said pleated material secured to and covering a major portion of said pleats and spaced axially from and positioned between said plates.

3. A filter element comprising a cylindrical core having perforations confined to one end thereof, filter material of a resinous impregnated paper around said core pleated in a direction longitudinal with the core axis, impervious plates closing the ends of said pleats, and an impervious cylindrical shell around said pleated material secured to and covering a major portion of the outside edges of said pleats and spaced axially from opposed inner surfaces of said plates.

4. A filter element comprising a cylindrically-shaped core perforated at only one end and having its axis in substantially vertical position, filter material around said core pleated in the direction parallel with the axis of said core, plates closing the ends of said pleats, a substantially impervious shell around said filter material secured to the outside edges of said pleats, and liquid passages at the top and bottom of said shell, said passages formed by the spacing of said shell axially inward from said plates the total area of the passage at the top being larger than that of the passage at the bottom.

5. A filtering device comprising a casing having a liquid inlet passage and a liquid outlet passage, a cylindrically-shaped element interposed between said passages including a cylindrical core contained entirely within said cylindrically shaped element having perforations, filter material of a resinous impregnated material around said core and pleated in a direction longitudinal with the axis thereof, impervious plates closing the ends of said pleats, and an imperforate cylindrical shell secured to and covering a major portion of the outside edges of the pleats and spaced from said plates to form openings adjacent to and encompassing each end of the element along the sidewalls thereof.

6. A filtering device comprising a head having a liquid inlet passage and a liquid outlet passage, a bowl connecting said passages, an element interposed between said passages including a core contained entirely within said element having perforations in only one end thereof, filter material around said core and pleated in a direction longitudinal with the axis thereof, plates closing the ends of said pleats, and an imperforate shell disposed in close proximity to and covering a major portion of the outside edges of the pleats having openings adjacent to and encompassing each end of the element along the sidewalls thereof.

References Cited in the file of this patent

UNITED STATES PATENTS

| | | |
|---|---|---|
| 2,218,339 | Manning | Oct. 15, 1940 |
| 2,230,174 | Beale | Jan. 28, 1941 |
| 2,239,868 | Williams | Apr. 29, 1941 |
| 2,347,927 | Paterson et al. | May 2, 1944 |
| 2,354,380 | Kasten | July 25, 1944 |
| 2,401,039 | Bauer | May 28, 1946 |
| 2,429,321 | La Brecque | Oct. 21, 1947 |
| 2,468,603 | Pew | Apr. 26, 1949 |
| 2,537,897 | Hunter | Jan. 9, 1951 |
| 2,547,857 | Cook | Apr. 3, 1951 |
| 2,683,536 | Kasten | July 13, 1954 |

FOREIGN PATENTS

| | | |
|---|---|---|
| 252,127 | Switzerland | Dec. 15, 1947 |